(12) United States Patent
Fang et al.

(10) Patent No.: US 12,269,783 B2
(45) Date of Patent: Apr. 8, 2025

(54) PROCESS FOR STABILIZING STEEL SLAG

(71) Applicant: Sichuan Fangda New Building Material Development Co., Ltd., Chengdu (CN)

(72) Inventors: Yanzhang Fang, Chengdu (CN); Yadi Pei, Chengdu (CN); Chaoquan Pan, Chengdu (CN); Yulin Zou, Chengdu (CN); Jianyou Xiong, Chengdu (CN); Rongbai Jiang, Chengdu (CN)

(73) Assignee: SICHUAN FANGDA NEW BUILDING MATERIAL DEVELOPMENT CO., LTD., Chengdu (CN)

( * ) Notice: Subject to any disclaimer, the term of this patent is extended or adjusted under 35 U.S.C. 154(b) by 559 days.

(21) Appl. No.: 17/831,785

(22) Filed: Jun. 3, 2022

(65) Prior Publication Data
US 2023/0183131 A1 Jun. 15, 2023

(30) Foreign Application Priority Data
Dec. 14, 2021 (CN) .......................... 202111526071.1

(51) Int. Cl.
*C04B 7/147* (2006.01)
*C04B 7/44* (2006.01)
*C04B 7/47* (2006.01)
*C04B 7/52* (2006.01)

(52) U.S. Cl.
CPC ................ *C04B 7/147* (2013.01); *C04B 7/44* (2013.01); *C04B 7/47* (2013.01); *C04B 7/52* (2013.01)

(58) Field of Classification Search
CPC .. C04B 7/147; C04B 7/44; C04B 7/47; C04B 7/52; C04B 5/00; C04B 18/141; C21B 2400/00; C21B 3/04
See application file for complete search history.

(56) References Cited

U.S. PATENT DOCUMENTS 6,334,885 B1 * 1/2002 Fukushima ............. C04B 7/153
106/737

FOREIGN PATENT DOCUMENTS

| CN | 107382116 A | * | 11/2017 |
| CN | 109443967 A | * | 3/2019 |
| JP | 6-206743 A | * | 7/1994 |

OTHER PUBLICATIONS

Zhao et al "Steam and Autoclave Treatments on Structure Characteristics of Steel Slag on Structure Characteristics of Steel Slag" MATEC Web of Conferences 67, 05015, DOI: 10.1051/matecconf/201667705015, SMAE 2016 (Year: 2016).*

Zhao et al "Steam and Autoclave Treatments on Structure Characteristics of Steel Slag on Structure Characteristics of Steel Slag", Advanced Materuak Research, SSN: 1662-8985, vols. 356-360, pp. 1919-1927 doi: 10.4028/www.scientific.net/AMR.356-360.1919 (Year: 2011).*

* cited by examiner

*Primary Examiner* — Anthony J Green
(74) *Attorney, Agent, or Firm* — HAUPTMAN HAM, LLP

(57) ABSTRACT

The present disclosure is related to the field of steel slag treatment, and in particular to a process for stabilizing steel slag, the process comprising subjecting the steel slag to an autoclave treatment by use of a high temperature and pressure saturated vapor at a pressure of 2.0 MPa or above. The process provides the slag with reliable volume stability and makes it possible to meet desired requirements of various building materials. Additionally, the process is low cost, non-polluting, and of very high industrial value.

8 Claims, 1 Drawing Sheet

PROCESS FOR STABILIZING STEEL SLAG

CROSS REFERENCE TO RELATED APPLICATION

This patent application claims the benefit and priority of Chinese Patent Application No. 202111526071.1, filed on Dec. 14, 2021, the disclosure of which is incorporated by reference herein in its entirety as part of the present application.

TECHNICAL FIELD

The present disclosure is related to the field of steel slag treatment, and in particular to a process for stabilizing steel slag.

BACKGROUND ART

Steel slag, a solid waste of a steel making process at a temperature of about 1550° C. or above, consists mainly of oxides of the elements in metallic charge materials, corroded furnace lining and lining repair materials, impurities such as sand due to metallic charge, and slag-making materials such as limestone, dolomite, fluorite, iron ore, and silica. At such a temperature, calcium oxide (CaO) and magnesium oxide (MgO) contained in some of the slag-making materials including limestone, dolomite, and fluorite can be changed into free CaO (f-CaO) and MgO (f-MgO) in a dead-burnt state, respectively. The dead-burnt f-CaO and f-MgO components in the slag do nearly not react with water to form hydration products $Ca(OH)_2$ and $Mg(OH)_2$, respectively, at room temperature in a short period of time, due to the fact that the steel slag is very hard and very dense. So, under such conditions, the products made of steel slag may not be subjected to cracking due to volume expansion caused by formation of $Ca(OH)_2$ and $Mg(OH)_2$. However, when these products are exposed to air during use for a long period of time, the f-CaO and f-MgO components contained therein are known to gradually react with moisture from the ambient atmosphere over time to form $Ca(OH)_2$ and $Mg(OH)_2$, respectively, and thus exhibit a 1 to 3 fold and 1 to 2 fold volume increase, respectively. This can influence the volume stability of the slag and cause the products made thereof to crack due to volume expansion.

Current domestic treatment methods for steel slag include the hot splashing method, air quenching method, roller method, granulation wheel method, and hot disintegrating method, all of which however lead to unsatisfactory volume stability of the slag. As a result, the slag treated by these methods is utilized in very narrow fields of application and is typically stored and dumped.

Sumitomo Metal Industries, Ltd. (Japan) has proposed to treat the slag with a superheated low-pressure (0.5 MPa) steam in an aging process. The slag so treated is found to exhibit an immersion expansion ratio of 0.5% or less but a chalking ratio by steam test of greater than 3%. Thus, the slag can only be used as a road base or subbase material or an asphalt pavement material and is not adequate to be used as any building material for other purposes. Due to this, this solution has been almost totally abandoned.

SUMMARY

Therefore, an objective of the present disclosure is to provide a treatment process for steel slag, which allows f-CaO and f-MgO in the slag to react with water to form $Ca(OH)_2$ and $Mg(OH)_2$ respectively such that the volume of the slag to fully expand during the hydration before it is made into a product, and eliminates volume instability of the slag during later use.

The objective of the present disclosure is realized by a process for stabilizing steel slag, comprising subjecting the steel slag to an autoclave treatment by use of a high temperature and pressure saturated vapor at a temperature of 211.38° C. or above and a pressure of 2.0 MPa or above.

In an embodiment, water vapor is used as the vapor.

In an embodiment, the pressure of the vapor is within a range of 2.0 to 2.5 MPa.

In an embodiment, the autoclave treatment comprises heating the slag to a temperature of 211.38° C. or above and maintaining the temperature for at least 2 hours, followed by cooling the slag to room temperature.

In a further embodiment, the slag is maintained at the temperature of 211.38° C. or above for 4 to 6 hours.

In a further embodiment, the slag is heated to the temperature of 211.38° C. or above during a time period of 1 to 1.5 hours. In a further embodiment, the slag is cooled to room temperature during a time period of 1 to 1.5 hours.

In an embodiment, the steel slag to be stabilized includes raw steel slag and steel slag tailings from different furnace types, and steel slag tailings produced by the hot splashing method, air quenching method, roller method, granulation wheel method, or hot disintegrating method, as described in the background, which is utilized to treat steel slag.

In an embodiment, the process further comprises: before the autoclave treatment, crushing the steel slag to a particle size of about 10 millimeters or less.

The process of the present disclosure provides several advantages.

The process can provide steel slag with reliable volume stability such that the slag would not be subjected to any volume expansion during later use, which however often occurs with the steel slag treated by the hot splashing method, air quenching method, roller method, granulation wheel method, or hot disintegrating method.

Since the process according to the present disclosure utilizes a high-pressure vapor to cure steel slag under a sealed environment, energy consumption is minimized and cost is thus substantially reduced.

Unlike the hot splashing method, air quenching method, roller method, granulation wheel method, or hot disintegrating method, all of which are required to be performed within the steel plant, the process according to the present disclosure is not limited in this regard and is allowed to be performed within the steel plant or in a physically separate place than the plant.

Further, the present process is environmentally friendly due to no discharge of waste residue or gas. Condensate water from the autoclave can be reused after appropriate treatment.

DETAILED DESCRIPTION OF THE EMBODIMENTS

Figure 1A:
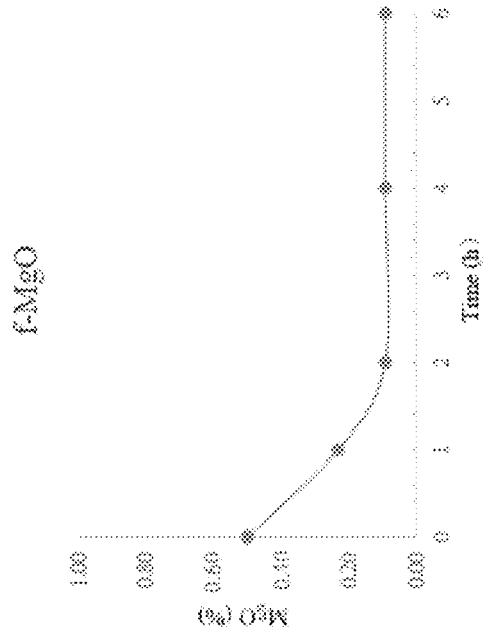
FIGS. 1A and 1B, shows graphs of FIG. 1A, f-CaO content and FIG. 1B, f-MgO content in steel slag versus time of autoclaving when the slag was autoclaved by use of a saturated vapor at 2 MPa.
Figure 1B:
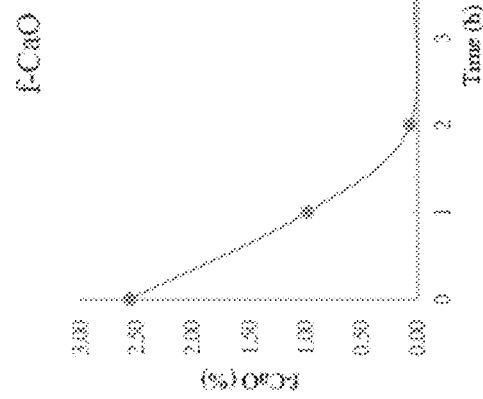

The present disclosure provides a process for stabilizing steel slag, comprising subjecting the steel slag to an autoclave treatment by use of a high temperature and pressure saturated vapor at a temperature of 211.38° C. or above and a pressure of 2.0 MPa or above.

To the applicant's knowledge, it is proposed here for the first time to use a saturated vapor to cure steel slag at high temperature and high pressure. It has been found that in this way f-CaO and f-MgO contained in the slag can quickly absorb and react with water to form $Ca(OH)_2$ and $Mg(OH)_2$ respectively such that the slag is subjected to volume expansion only during this process and would not be subjected to any volume expansion again during later use. Thus, the biggest obstacle that has retarded the large scale utilization of steel slag is overcome by the process of the present disclosure. In addition, with the present process, the slag can be broken into particles or even powder under the action of the expanding force, a stress due to thermal expansion, and a wedging force of water, thereby leading to substantially reduced energy consumption required for steel slag crushing.

It is found that if the vapor pressure is lower than 2.0 MPa, the hydration reaction of f-CaO and f-MgO is not sufficient, causing the obtained slag to fail to meet the desired requirements, and time of autoclaving required to achieve the same quality of the slag is substantially extended, leading to an uneconomic production.

In an embodiment, water vapor is used as the vapor.

In an embodiment, the pressure of the vapor is within a range of 2.0 to 2.5 MPa.

In an embodiment, the autoclave treatment comprises heating the steel slag to a temperature of 211.38° C. or above and maintaining the temperature for at least 2 hours, followed by cooling the slag to room temperature.

In a further embodiment, the slag is maintained at the temperature of 211.38° C. or above for 4 to 6 hours.

In a further embodiment, the slag is heated to the temperature of 211.38° C. or above during a time period of 1 to 1.5 hours. In a further embodiment, the slag is cooled to room temperature during a time period of 1 to 1.5 hours.

In an embodiment, the steel slag to be stabilized includes raw steel slag and steel slag tailings from different furnace types, and steel slag tailings produced by the hot splashing method, air quenching method, roller method, granulation wheel method, or hot disintegrating method, as described in the background, which is utilized to treat steel slag. The furnace types include converters and electric furnaces.

In an embodiment, the process further comprises: before the autoclave treatment, crushing the steel slag to a particle size of about 10 millimeters or less.

It was found that the steel slag treated by the process according to the present disclosure exhibited a chalking ratio by steam test of 1.5% or less (meeting the requirement (≤5.9%) of Chinese national standard), an immersion expansion ratio of 0.5% or less (meeting the requirement (≤2.0%) of GB/T25824-2010 (Steel Slag for Road)), and an autoclave expansion ratio of 0.8% or less (meeting the requirement (≤0.8%) of GB/T32546-2016 (Technical Requirements for Application of Steel Slag)).

The steel slag produced by the process according to the present disclosure can be used as a fine aggregate for cement concrete, a steel slag fine powder, a road base or subbase material, an asphalt pavement material, and a main material for ordinary ready-mixed mortar, concrete perforated brick, pavior brick, and foam concrete block.

The present disclosure will now be described in further detail by way of the following example, which however should not be construed as limiting the disclosure.

Example

An amount of steel slag tailings were coarsely crushed and then finely crushed, and were subjected to iron removal. Slag particles were obtained with a particle size of about 10 millimeters or less.

The obtained slag particles were placed into an autoclave. The vapor pressure inside the autoclave was controlled at 2 MPa. The slag particles were autoclaved at 211.38° C. for 6 hours (the particles were heated to 211.38° C. during 1.5 hours and were maintained at that temperature for 3.5 hours, and were then cooled to room temperature during 1 hour).

Results:

No waste water or residue was discharged, and the content of dust in the discharged gas was no more than 30 $mg/Nm^3$.

The amount of vapor used was 120 kg per ton of the steel slag. Power consumption was 3.6 kwh per ton of the slag. Water consumption was 0.2 ton per ton of the slag.

It was found that the obtained slag product exhibited a chalking ratio by steam test of 1.1%, an immersion expansion ratio of 0.45%, and an autoclave expansion ratio of 0.6% (the chalking ratio and the immersion expansion ratio were determined according to GB/T24175-2009 (Test method for stability of steel slag); the autoclave expansion ratio was determined according to YB/T4228-2010).

Therefore, the chalking ratio by steam test of the slag treated by the process according to the present disclosure meets the requirement (≤5.9%) of YB/T 4201 (Steel Slag Sand for Ready-mixed Mortar). The immersion expansion ratio of the slag treated by the process according to the present disclosure meets the requirement (≤2.0%) of GB/T25824-2010 (Steel Slag for Road) and of YB/T 801-2008 (Steel Slag for Engineering Backfill). The autoclave expansion ratio of the slag treated by the process according to the present disclosure meets the requirement (≤0.8%) of YB/T4228-2010 (Steel Slag for Concrete Perforated Brick and Concrete Pavior Brick) and of GB/T32546-2016 (Technical Requirements for Application of Steel Slag).

The process according to the disclosure was validated by means of a series of experiments, and it was confirmed that the chalking ratio by steam test, the immersion expansion ratio, and the autoclave expansion ratio of the slag treated by the process according to the present disclosure were better than the above-mentioned standards. It is important for the resource utilization of steel slag to absorb the huge output thereof, so it is not sufficient to just utilize the slag as a road base or subbase material and an asphalt pavement material, and it is desired that the slag can be used as other road building materials or building materials for other purposes which are in high demand and can absorb the huge output of the slag, such as, aggregates, cement concrete admixtures, and dry-mixed mortar. The process according to the present disclosure makes this possible.

What is claimed is:

1. A process for stabilizing steel slag, comprising:
subjecting the steel slag to an autoclave treatment by use of a high temperature and pressure saturated vapor at a temperature of 211.38° C. or above and a pressure of 2.0 MPa or above.

2. The process according to claim 1, wherein, water vapor is used as the vapor.

3. The process according to claim 1, wherein, the pressure of the vapor is within a range of 2.0 to 2.5 MPa.

4. The process according to claim 1, wherein, the autoclave treatment comprises heating the steel slag to a temperature of 211.38° C. or above and maintaining the temperature for at least 2 hours, followed by cooling the slag to room temperature.

5. The process according to claim 1, wherein, the slag is maintained at the temperature of 211.38° C. or above for 4 to 6 hours.

6. The process according to claim 1, wherein, the slag is heated to the temperature of 211.38° C. or above during a time period of 1 to 1.5 hours, and wherein the slag is cooled to room temperature during a time period of 1 to 1.5 hours.

7. The process according to claim 1, wherein, the steel slag to be stabilized comprises raw steel slag and steel slag tailings from different furnace types, and steel slag tailings produced by the hot splashing method, air quenching method, roller method, granulation wheel method, or hot disintegrating method.

8. The process according to claim 1, wherein, the process further comprises: before the autoclave treatment, crushing the steel slag to a particle size of 10 millimeters or less.

* * * * *